(12) United States Patent
Kumar et al.

(10) Patent No.: US 10,581,749 B2
(45) Date of Patent: Mar. 3, 2020

(54) AUTOMATIC DISCOVERY OF MAXIMUM TRANSMISSION UNIT SIZE FOR A SOFTWARE DEFINED NETWORK

(71) Applicant: NICIRA, INC., Palo Alto, CA (US)

(72) Inventors: Vasantha Kumar, Pune (IN); Sandeep Kasbe, Pune (IN)

(73) Assignee: Nicira, Inc., Palo Alto, CA (US)

( * ) Notice: Subject to any disclaimer, the term of this patent is extended or adjusted under 35 U.S.C. 154(b) by 0 days.

(21) Appl. No.: 15/796,885

(22) Filed: Oct. 30, 2017

(65) Prior Publication Data

US 2019/0020593 A1 Jan. 17, 2019

(30) Foreign Application Priority Data

Jul. 13, 2017 (IN) .............................. 201741024760

(51) Int. Cl.
*H04L 12/28* (2006.01)
*H04L 12/56* (2006.01)
*H04L 12/805* (2013.01)
*H04L 12/781* (2013.01)
*H04L 29/06* (2006.01)
*H04L 12/46* (2006.01)
*H04L 12/715* (2013.01)
*H04L 12/707* (2013.01)

(52) U.S. Cl.
CPC ........ *H04L 47/365* (2013.01); *H04L 12/4633* (2013.01); *H04L 45/52* (2013.01); *H04L 45/64* (2013.01); *H04L 47/36* (2013.01); *H04L 63/029* (2013.01); *H04L 63/164* (2013.01); *H04L 63/20* (2013.01); *H04L 45/24* (2013.01)

(58) Field of Classification Search
CPC ..... H04L 47/365; H04L 45/42; H04L 63/029; H04L 63/20; H04L 12/4633; H04L 45/23
See application file for complete search history.

(56) References Cited

U.S. PATENT DOCUMENTS

| | | | | |
|---|---|---|---|---|
| 6,725,253 | B1* | 4/2004 | Okano | H04L 29/12009 370/237 |
| 6,941,366 | B2* | 9/2005 | Antes | H04L 63/0272 370/248 |
| 7,304,959 | B1* | 12/2007 | Swaroop | H04L 12/66 370/233 |
| 7,697,524 | B2* | 4/2010 | Subramanian | H04L 45/16 370/390 |
| 8,005,968 | B2* | 8/2011 | Mason | H04L 45/021 709/228 |
| 8,576,875 | B2* | 11/2013 | Sivakumar | H04L 29/1249 370/464 |
| 9,923,835 | B1* | 3/2018 | Singh | H04L 47/365 |

(Continued)

*Primary Examiner* — Stephen M D Agosta

(57) ABSTRACT

The technology disclosed herein enables the automatic discovery of MTU size across a software defined network (SDN). In a particular embodiment, a method provides, in a management plane of the SDN, receiving a first MTU request from a first endpoint of the SDN that indicates a second endpoint of the SDN to which the first endpoint will transfer first data. The method further provides tracing a first path through the SDN for the first data between the first endpoint and the second endpoint, determining the smallest MTU along the first path, and setting a first MTU to a value less than or equal to the smallest MTU along the first path. The method also includes providing the first MTU to the first endpoint.

27 Claims, 7 Drawing Sheets

(56) References Cited

U.S. PATENT DOCUMENTS

| | | | |
|---|---|---|---|
| 9,935,887 B1* | 4/2018 | Maharia | H04L 47/365 |
| 2002/0138443 A1* | 9/2002 | Schran | G06Q 20/382 |
| | | | 705/64 |
| 2008/0062879 A1* | 3/2008 | Sivakumar | H04L 29/1249 |
| | | | 370/235 |
| 2008/0165775 A1* | 7/2008 | Das | H04L 47/10 |
| | | | 370/392 |
| 2009/0285238 A1* | 11/2009 | Shiraishi | H04L 49/90 |
| | | | 370/474 |
| 2011/0090851 A1* | 4/2011 | Khalil | H04L 47/10 |
| | | | 370/328 |
| 2012/0051236 A1* | 3/2012 | Hegde | H04L 43/10 |
| | | | 370/252 |
| 2012/0257582 A1* | 10/2012 | Damnjanovic | H04L 5/001 |
| | | | 370/329 |
| 2013/0058306 A1* | 3/2013 | Noh | H04L 1/1671 |
| | | | 370/329 |
| 2014/0105110 A1* | 4/2014 | Hoshino | H04W 52/18 |
| | | | 370/328 |
| 2014/0211767 A1* | 7/2014 | Lunttila | H04W 72/1289 |
| | | | 370/336 |
| 2014/0280834 A1* | 9/2014 | Medved | H04L 47/122 |
| | | | 709/223 |
| 2014/0301395 A1* | 10/2014 | Khanal | H04L 45/021 |
| | | | 370/392 |
| 2014/0321406 A1* | 10/2014 | Marinier | H04B 7/024 |
| | | | 370/329 |
| 2015/0016317 A1* | 1/2015 | Park | H04W 52/146 |
| | | | 370/280 |
| 2015/0113132 A1* | 4/2015 | Srinivas | H04L 41/0816 |
| | | | 709/224 |
| 2015/0117451 A1* | 4/2015 | Kaneriya | H04L 45/745 |
| | | | 370/392 |
| 2015/0312658 A1* | 10/2015 | Winzer | H04Q 11/0005 |
| | | | 398/5 |
| 2015/0341278 A1* | 11/2015 | Sundar | H04L 47/365 |
| | | | 370/392 |
| 2016/0065386 A1* | 3/2016 | Hari | H04L 12/4679 |
| | | | 370/254 |
| 2016/0100422 A1* | 4/2016 | Papasakellariou | H04L 1/1861 |
| | | | 370/329 |
| 2016/0164794 A1* | 6/2016 | Ramalingam | H04L 47/365 |
| | | | 370/235 |
| 2017/0005943 A1* | 1/2017 | Raj | H04L 45/38 |

* cited by examiner

AUTOMATIC DISCOVERY OF MAXIMUM TRANSMISSION UNIT SIZE FOR A SOFTWARE DEFINED NETWORK

RELATED APPLICATIONS

Benefit is claimed under 35 U.S.C. 119(a)-(d) to Foreign Application Serial No. 201741024760 filed in India entitled "AUTOMATIC DISCOVERY OF MAXIMUM TRANSMISSION UNIT SIZE FOR A SOFTWARE DEFINED NETWORK", on Jul. 13, 2017, by NICIRA, INC., which is herein incorporated in its entirety by reference for all purposes.

TECHNICAL BACKGROUND

A maximum transmission unit (MTU) is the maximum amount of data that can be transmitted per unit of data. The MTU between a source and a destination of data is influenced by the protocols used to transmit that data. For example, tunneling protocols, such as Virtual Extensible Local Area Network (VXLAN) and Geneve, may be used to create a logical overlay network on physical network hardware. Logical overlay networks can be manipulated to be more dynamic to meet the needs of modern computing environments. The ability to redefine a logical network in that manner leads to dynamic logical networks being referred to as software defined networks (SDNs). SDNs, like the physical network interfaces on which they are implemented, have MTU requirements that are typically based on the protocols in use.

In particular, the tunneling protocol, or protocols, used to implement a SDN include their own network overhead or MTU requirements which may further reduce the size of a MTU for data traffic. For example, a data center may have a MTU of 9000 bytes while a tunneling protocol used between two endpoints within the data center requires 100 bytes of overhead. The MTU of the transferring endpoint would therefore need to be set to 8900 bytes to account for the tunneling protocol rather than the full 9000 bytes allowed by the data center. Moreover, the MTU may be different depending on which endpoints are involved. For instance, an additional tunneling protocol may be used to transport data between sites when two endpoints are located at different sites. If that additional tunneling protocol uses an additional 100 bytes of overhead, then the MTU at the transferring endpoint would need to be set to 8800 bytes. Likewise, the overhead required by some tunneling protocols may itself vary (e.g., Geneve allows for the carrying of information about an encapsulated packet and the metadata representing that data may vary in size depending on that information).

It may be possible for an administrator of an SDN to determine a minimum MTU size that would be imposed between two endpoints of the SDN and set the MTU at all endpoints to that minimum MTU size, otherwise, packets would be dropped along paths that do not satisfy the set MTU. However, larger MTUs are more efficient for transporting data. Therefore, the administrator would be undermining the efficiency of the SDN between endpoints that would otherwise be able to transmit using a larger MTU.

SUMMARY

The technology disclosed herein enables the automatic discovery of MTU size across a software defined network (SDN). In a particular embodiment, a method provides, in a management plane of the SDN, receiving a first MTU request from a first endpoint of the SDN that indicates a second endpoint of the SDN to which the first endpoint will transfer first data. The method further provides tracing a first path through the SDN for the first data between the first endpoint and the second endpoint, determining the smallest MTU along the first path, and setting a first MTU to a value less than or equal to the smallest MTU along the first path. The method also includes providing the first MTU to the first endpoint.

In some embodiments, the first endpoint transfers the first data to the second endpoint using the first MTU.

In some embodiments, setting the first MTU comprises determining an amount of metadata required for network overhead, which may include data necessary for one or more protocols in the Internet Protocol Security (IPsec) suite of protocols, when transferring data between the first endpoint and the second endpoint and setting the first MTU to a value equal to the smallest MTU along the first path less the amount of metadata. In those embodiments, the network overhead may include metadata for a network tunnel, such as a Virtual Extensible Local Area Network (VXLAN) or Geneve tunnel, between the first endpoint and the second endpoint.

In some embodiments, the first endpoint transfers the first MTU request to the management plane upon receiving the first data from a virtual machine. In those embodiments, the first endpoint may instruct the virtual machine to resend the first data using the first MTU when the first data does not comply with the first MTU.

In some embodiments, the first endpoint stores the first MTU for use with subsequent data between the first endpoint and the second endpoint.

In some embodiments, the first endpoint probes a physical network path corresponding to the first path to determine whether a MTU of an element on the physical network path decreases the first MTU.

In another embodiment, a system is provided having one or more computer readable storage media and a processing system operatively coupled with the one or more computer readable storage media. Program instructions stored on the one or more computer readable storage media, when read and executed by the processing system, direct the processing system to provide a management plane of the SDN and, in the management plane, receive a first MTU request from a first endpoint of the SDN that indicates a second endpoint of the SDN to which the first endpoint will transfer first data. The program instructions further direct the processing system to trace a first path through the SDN for the first data between the first endpoint and the second endpoint, determine the smallest MTU along the first path, and set a first MTU to a value less than or equal to the smallest MTU along the first path. The program instructions also direct the processing system to provide the first MTU to the first endpoint.

In yet another embodiment, another system is provided having one or more computer readable storage media and a processing system operatively coupled with the one or more computer readable storage media. Program instructions stored on the one or more computer readable storage media, when read and executed by the processing system, direct the processing system to provide a first endpoint of the SDN. The program instructions further direct the processing system to, in the first endpoint, transfer a first MTU request to a management plane of the SDN that indicates a second endpoint of the SDN to which the first endpoint will transfer first data. The management plane, responsive to receiving the first MTU request, traces a first path through the SDN for the first data between the first endpoint and the second endpoint, determines the smallest MTU along the first path, sets a first MTU to a value less than or equal to the smallest MTU along the first path, and provides the first MTU to the first endpoint. The program instructions further direct the processing system to, in the first endpoint, receive the a first MTU from the management plane in response to the request.

DETAILED DESCRIPTION

The implementations described herein provide for the MTU used by a transmitting endpoint to depend upon the path through the SDN between the transmitting endpoint and a receiving endpoint. Since the protocols used from a first endpoint to a second endpoint may differ from the protocols used from the first endpoint to a third endpoint, tailoring the MTU used by the first endpoint to a specific destination endpoint allows the first endpoint to maximize the MTU to each endpoint. As such, data transfer efficiency on a path that allows for a larger MTU does not suffer due to the MTU on a path to another endpoint being smaller. Likewise, protocols having metadata that is dynamic, depending on characteristics of the payload or otherwise, may be used while allowing the transferring endpoint to use the largest MTU in each particular metadata situation.

Figure 1:
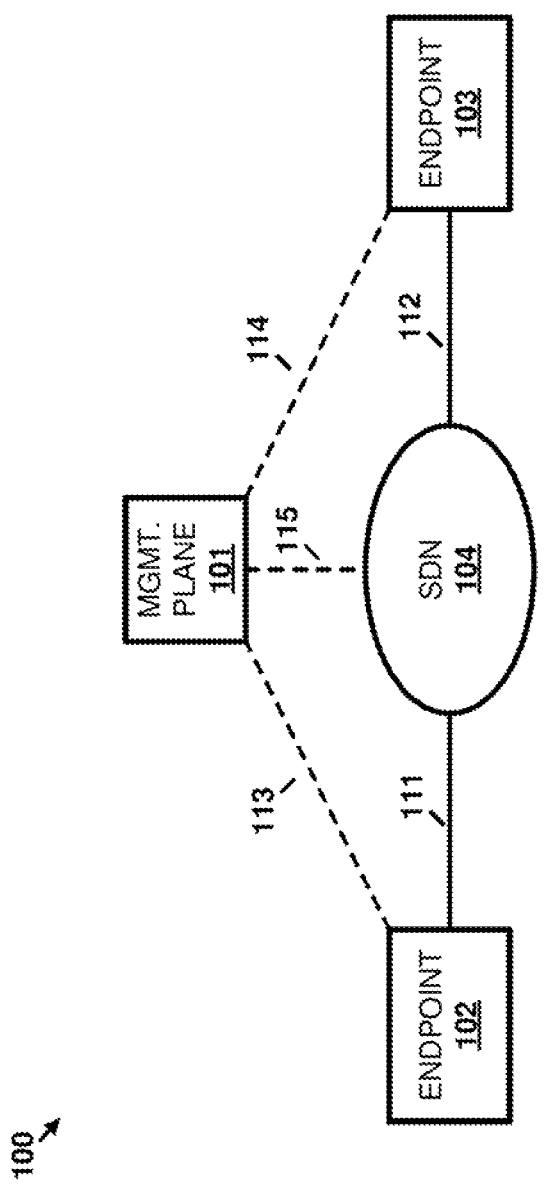
FIG. 1 illustrates an implementation for automatically detecting MTU size across an SDN.

FIG. 1 illustrates implementation 100 for automatically detecting MTU size across an SDN. Implementation 100 includes management plane 101, endpoint 102, endpoint 103, and SDN 104. Endpoint 102 and endpoint 103 communicate with SDN 104 over logical communication links 111 and 112, respectively. Management plane 101 communicates with endpoint 102, endpoint 103, and SDN 104 over control links 113, 114, and 115, respectively.

In operation, endpoint 102 and endpoint 103 exchange packet communications with each other over SDN 104. The packet communications between endpoint 102 and endpoint 103 are sometimes referred to as travelling over a data plane. In contrast, the communications exchanged with management plane 101 over control links 113-115 do not travel over the data plane but, rather, over a control plane. The data plane, including SDN 104, and the control plane are logical networks built on physical computing and networking resources. SDN 104 may be implemented using a virtual local area network (VLAN), VXLAN, Geneve, or some other networking protocol used to implement logical networks on physical networking components—including combinations thereof. Management plane 101 controls the configuration of SDN 104 and endpoints thereon to ensure traffic is properly routed using the one or more protocols used to define SDN 104. Management plane 101 may be implemented using a physical computing system or may be implemented within a virtualized computing element, such as a virtual machine or container. Endpoint 102 and endpoint 103 each comprises a software element executing on a physical computing system that act as logical endpoints on SDN 104. For instance, endpoint 102 and endpoint 103 may each comprise a tunnel endpoint for packets encapsulated using a tunneling protocol, such as VXLAN, Geneve, IPsec, Generic Routing Encapsulation (GRE), Multiprotocol Label Switching (MPLS), or some other protocol.

Though not shown, SDN 104 may include any number of other endpoints as well. The MTU for data transferred from endpoint 102 to endpoint 103 may be different than the MTU may be for other endpoints on SDN 104. Likewise, the MTU between endpoint 102 and endpoint 103 may be dynamic depending on the data being transferred. Management plane 101 herein is tasked with ensuring the MTU between each pair of endpoints is maximized for the protocol requirements between each two specific endpoints rather than simply setting the MTU for all endpoints to a value low enough to satisfy all paths.

Figure 2:
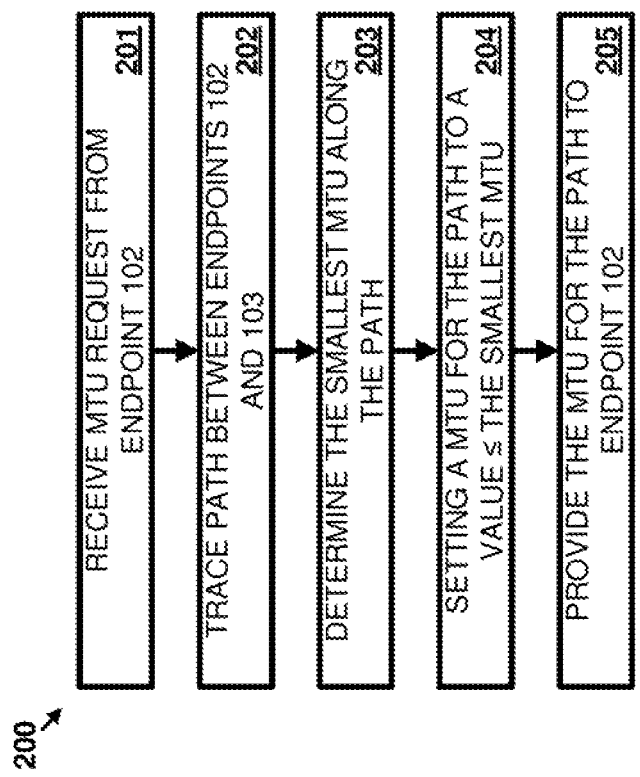
FIG. 2 illustrates a scenario for the implementation to automatically detect MTU size across an SDN.

FIG. 2 illustrates scenario 200 for implementation 100 to automatically detect MTU size across an SDN. Scenario 200 provides management plane 101 receiving a MTU request from endpoint 102 that indicates endpoint 103 to which endpoint 102 will be transferring data (201). The request is transferred over the control plane via control link 113 between endpoint 102 and management plane 101. Management plane 101 traces a path through SDN 104 for the data between endpoint 102 and endpoint 103 (202). The trace may be performed in response to management plane 101 receiving the MTU request or may be performed prior to receiving the request. For example, each time a new endpoint is added to SDN 104, management plane 101 may perform traces between that newly added endpoint and any other endpoints on SDN 104 with which the new endpoint may communicate. Given that management plane 101 manages the configuration of SDN 104, management plane 101 is already in possession of the information needed to trace the logical route (i.e., path) between endpoint 102 and endpoint 103.

Once the path between endpoint 102 and endpoint 103 is determined, management plane 101 determines the smallest MTU along that path (203). Again, overseeing the configuration of SDN 104 and the protocols used therein, management plane 101 is in possession of the MTU requirements of the protocols along the path. Hence, those MTU requirements are compared with to determine which is the smallest MTU along the path to ensure the data is not formatted by endpoint 102 to be any bigger than the smallest MTU. For example, the MTU of one protocol may be 9000 bytes but the MTU of another may be 6000 bytes, so the MTU of 6000 would need to be used because that MTU satisfies both MTUs along the path.

Management plane 101 then sets the MTU to be used by endpoint 102 for the data to a value less than or equal to the smallest MTU along the path (204). In cases where the protocol with the smallest MTU will be encapsulating (or otherwise transporting) data already formatted using another protocol, then the MTU to be used by endpoint 102 would need to be set even smaller to account for the overhead of the additional other protocol also having to fit within that smallest MTU. Using the above example, if the smallest MTU is 6000 bytes but overhead of a protocol used within that MTU is 100 bytes, then management plane 101 would set the MTU to be used by endpoint 102 to 5900 bytes. Other reasons for setting the MTU to a value less than the smallest MTU along the path may also be used. In some examples, endpoint 102 may have further provided management plane 101 with information descriptive of the traffic to be transferred to endpoint 103, such as a classification of the traffic, type of data being carried in the traffic, etc. In those examples, management plane 101 may set the MTU based on that information. For instance, management plane 101 may determine that a protocol in use on the path between endpoint 102 and endpoint 103 uses a varying amount of overhead (e.g., metadata) depending on the classification of the traffic being transferred. Management plane 101 can then determine the amount of overhead used by the protocol for traffic of the classification indicated by endpoint 102 and adjust the MTU to account for that specific amount of overhead.

After determining the MTU to be used by endpoint 102, management plane 101 provides that MTU to endpoint 102 in answer to the MTU request (205). Endpoint 102 may then transfer the data over SDN 104 to endpoint 103 in accordance with the MTU received from management plane 101. The MTU used is tailored in the above steps for the traffic being transferred between endpoint 102 and endpoint 103. As such, even if another path over SDN 104 would require a smaller MTU, the traffic between endpoint 102 and endpoint 103 does not have to conform to that lower MTU, as would be required if all traffic across SDN 104 was set to the same MTU.

Figure 3:
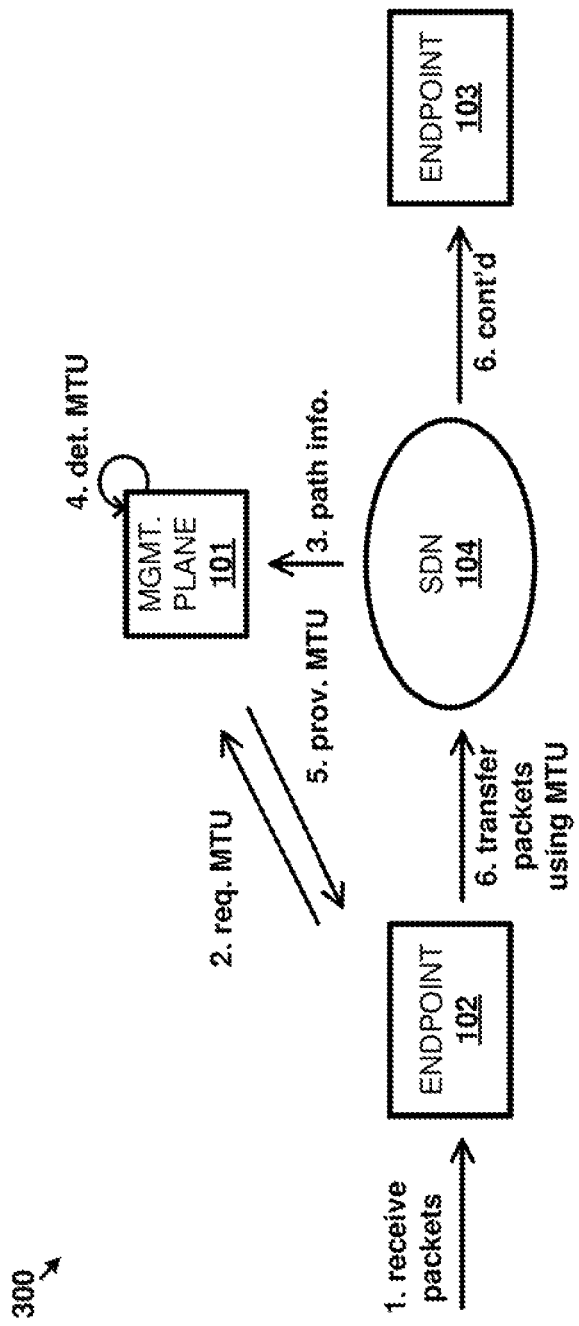
FIG. 3 illustrates another scenario for the implementation to automatically detect MTU size across an SDN.

FIG. 3 illustrates scenario 300 for implementation 100 to automatically detect MTU size across an SDN. In scenario 300, endpoint 102 is an endpoint on SDN 104 for traffic received from another element that is to be sent over SDN 104. For example, endpoint 102 may be a tunnel endpoint and may receive the packets from an application, such as a guest process in a virtualized computing element, executing on the same host in which endpoint 102 is executing. Regardless of where the packets originate, endpoint 102 receives the packets at step 1 for transfer over SDN 104 to endpoint 103. In response to receiving the packets, endpoint 102 requests an MTU for the packets at step 2 from management plane 101.

To service the MTU request from endpoint 102, management plane 101 determines path information about the path the packets will take through SDN 104 to endpoint 103. While scenario 300 shows the path information being passed to SDN 104, it should be understood that management plane 101 likely already knows the path information since management plane 101 handles the configuration of SDN 104. Thus, management plane 101 may not need to receive any path information from elements of SDN 104, including endpoint 102 and endpoint 103. The path information at least indicates an MTU for each protocol along the path (if such an MTU exists for a particular protocol) between endpoint 102 and endpoint 103. Using the path information, management plane 101 determines an MTU at step 4 that should be used by endpoint 102 for the packets. The MTU is set to a value that will ensure the packets will satisfy the MTUs of all protocols used along the path and accounts for any network overhead that must fit within the MTU in addition to the packets that will be transferred between endpoint 102 and endpoint 103.

After the MTU is determined, management plane 101 transfers the MTU to endpoint 102 at step 5 in response to the MTU request. Upon receiving the MTU, endpoint 102 ensures the received packets satisfy the MTU and then transfer the packets at step 6 to endpoint 103 over SDN 104.

In some cases, if the packets do not satisfy the MTU (i.e., are larger than the MTU), endpoint 102 may be configured to reformat the packets to satisfy the MTU. Although, in other cases, endpoint 102 may indicate to the source of the packets that the packets should be resent to endpoint 102 in a size that satisfies the MTU. Endpoint 102 would then send the resized packets to endpoint 103.

Figure 4:
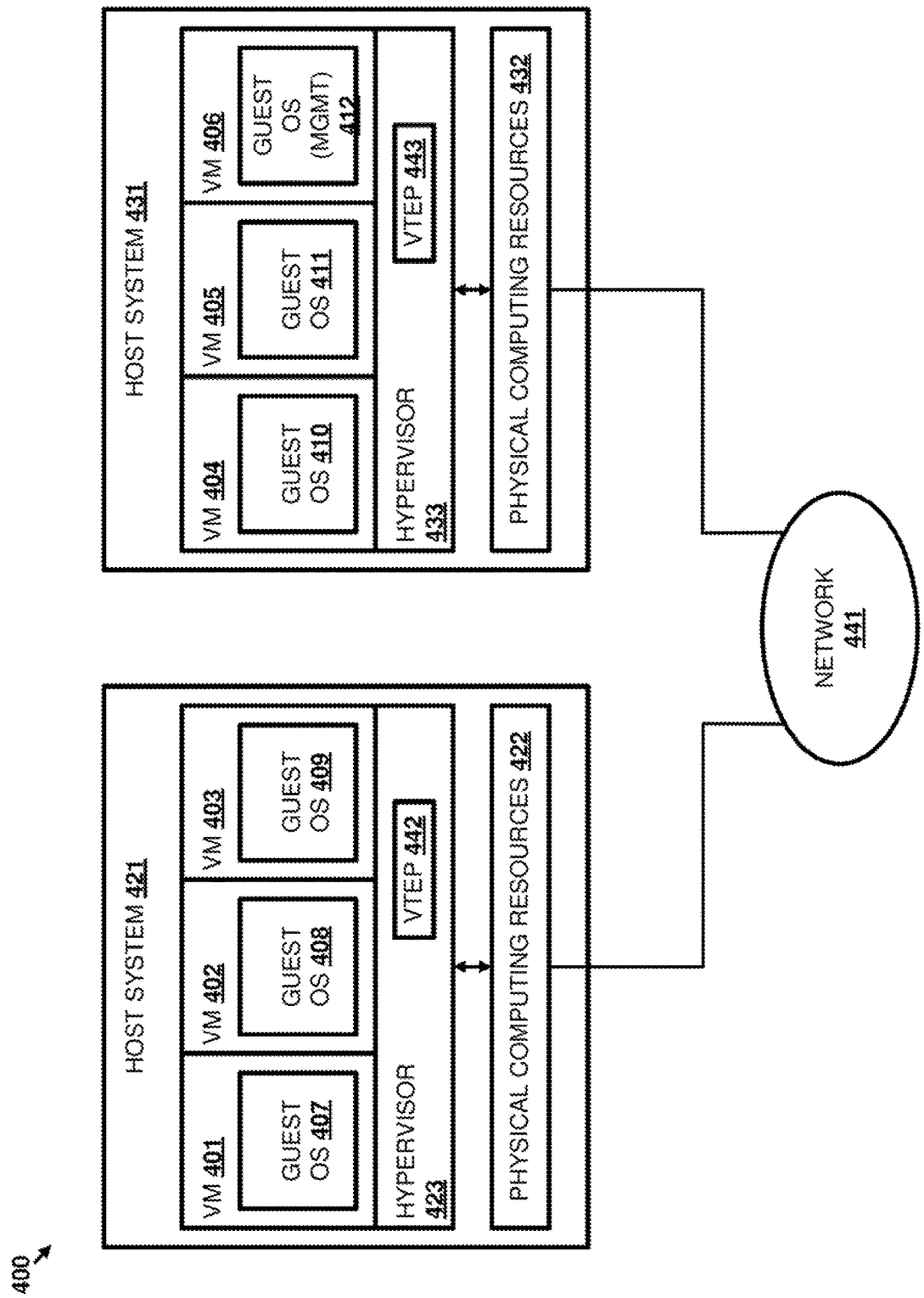
FIG. 4 illustrates another implementation for automatically detecting MTU size across an SDN.

FIG. 4 illustrates implementation 400 for automatically detecting MTU size across an SDN. Implementation 400 includes host computing system 421, host computing system 431, and network 441. Network 441 may include the Internet, one or more local area networks, one or more wide area networks, and/or one or more other types of networks between computing systems.

In this example, host computing system 421 executes hypervisor 423 to allocate physical computing resources 422 among virtual machines 401-403. Likewise, host computing system 431 executes hypervisor 433 to allocate physical computing resources 432 among virtual machines 404-406. Physical computing resources 422 and 432 may include processing resources (e.g., processing circuitry, CPU time/cores, etc.), memory space (e.g., random access memory, hard disk drive(s), flash memory, etc.), network interfaces, user interfaces, or any other type of resource that a physical computing system may include. Hypervisor 423 and hypervisor 433 include Virtual Extensible Local Area Network (VXLAN) Endpoint (VTEP) 442 and VTEP 443, respectively. Guest operating systems (Guest OSs) 407-412 execute within virtual machines 401-406, respectively.

It should be understood that the distribution of virtual machines evenly across two host computing systems, as shown in FIG. 4, is merely exemplary. The six virtual machines shown may instead be implemented on any number of host computing systems from one to eight. Likewise, host computing systems 421 and 431 could host additional hosts (e.g., hypervisors) and virtual machines and/or other virtual elements that are not involved in this example.

Figure 5:
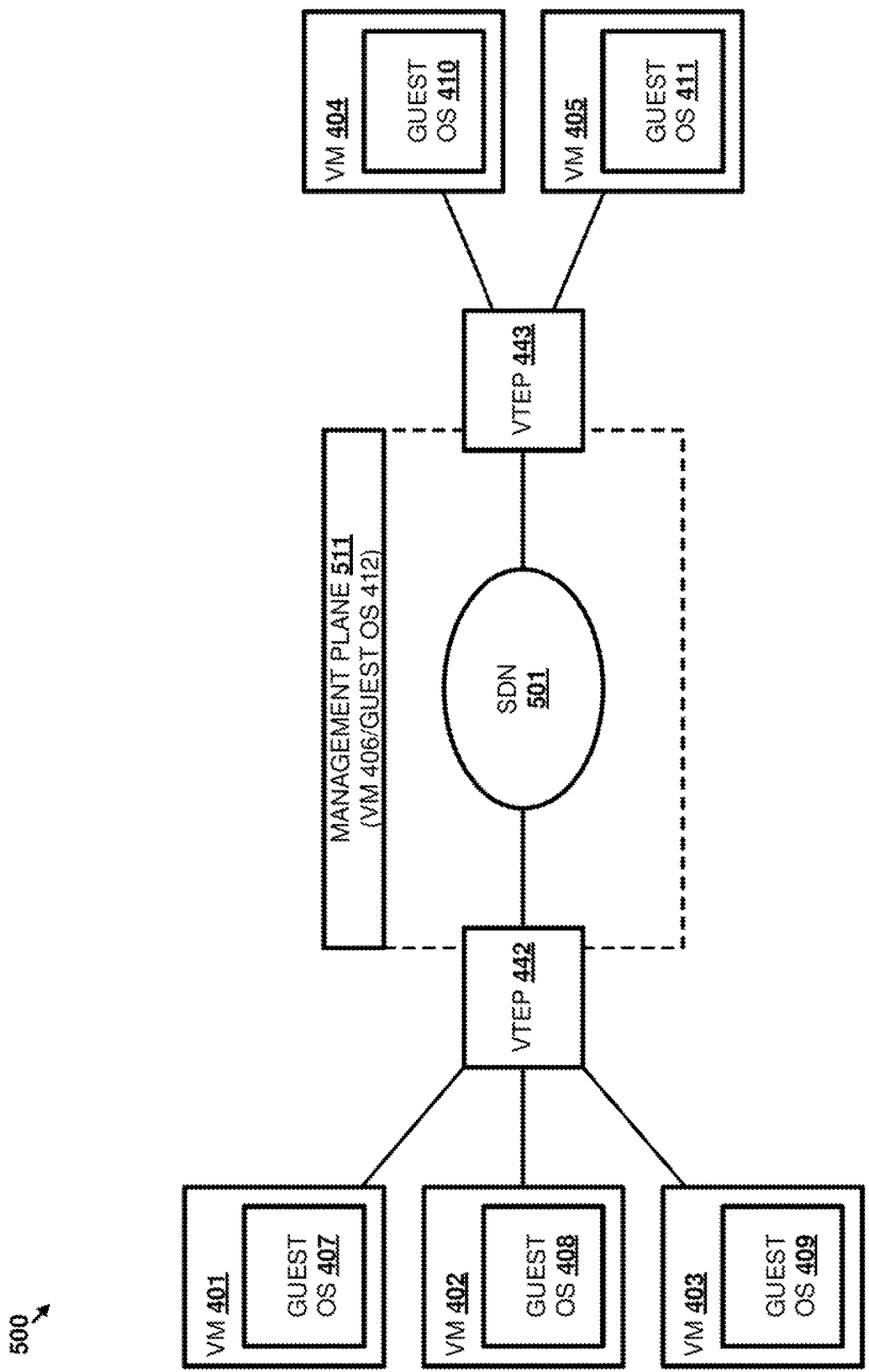
FIG. 5 illustrates a logical arrangement of the other implementation for automatically detecting MTU size across an SDN.

FIG. 5 illustrates logical arrangement 500 of implementation 400 for automatically detecting MTU size across an SDN. Logical arrangement 500 shows paths by which packet communications from each of guest OSs 407-409 are routed to guest OSs 410-411 and in the reverse direction. Packets pass from a guest OS to the virtual machine in which the guest OS is executing. Though not shown, each of virtual machines 401-405 may include a virtualized network interface component, such as a virtual network interface card (VNIC), to which guest OSs 407-411 pass packets for transfer. VTEPs 442 and 443 would therefore receive the packets from virtual machines 401-405 via those virtualized network interface components. VTEPs 442 and 443 transfer packets between host computing system 421 and host computing system 431 on behalf of guest OSs 407-411. While not shown, a virtual switch may be implemented by hypervisors 423 and 433 between virtual machines 401-405 and their respective VTEPs 442 and 443. These virtual switches may handle packet routing between the virtual machines and the VTEPs while also handling communications between virtual machines of the same host (e.g., packets transferred between virtual machine 402 and virtual machine 403).

SDN 501 is a logical overlay network built atop network 441 and host computing systems 421 and 431. In this example, VTEP 442 and VTEP 443 are included in SDN 501. In other examples, virtualized network interfaces of virtual machines 401-405 may also be included in SDN 501. SDN 501 is configured and managed via management plane 511. Management plane 511 is implemented in guest OS 412 (e.g., may be one or more applications executing within guest OS 412), which does not exchange communications over the data plane used for packet traffic between virtual machines 401-405. Rather, management plane 511 controls elements of SDN 501 over a control plane, which is a separate logical network built atop network 441 and host computing systems 421 and 431. Since management plane 511 is aware of the protocol configurations for traversing SDN 501, management plane 511 is aptly suited to determine an MTU that should be used between any two endpoints located thereon.

Figure 6:
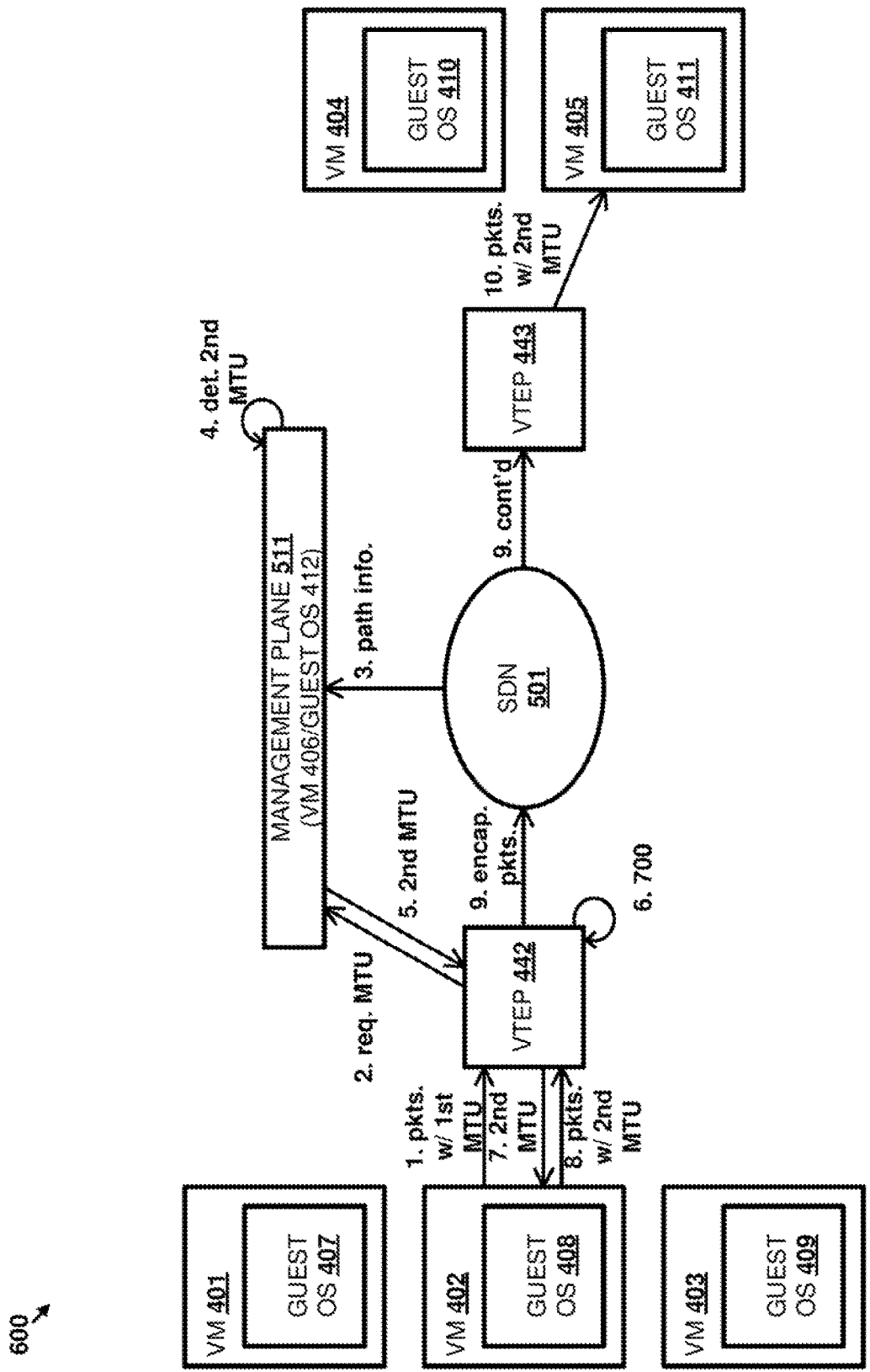
FIG. 6 illustrates a scenario for the other implementation to automatically detect MTU size across an SDN.

FIG. 6 illustrates scenario 600 for implementation 400 to automatically detect MTU size across an SDN. In this example, packets are being transferred from guest OS 408 and virtual machine 402 to guest OS 411 and virtual machine 405. The packets for transfer are received at step 1 by VTEP 442 from virtual machine 402. The packets have a give maximum size, which may be dictated by an MTU (called the first MTU in this example) that guest OS 408 uses as a default or was otherwise programmed to use. Upon receiving the packets, VTEP 442 transfers a MTU request at step 2 to management plane 511. The MTU request indicates that the packets will be transferred from VTEP 442 to VTEP 443 for delivery to guest OS 411 in virtual machine 405.

In response to the MTU request, at step 3, management plan 511 identifies the path through SDN 501 that will be used by the packets and determines relevant MTU information about the path. While scenario 600 shows management plane 411 receiving the path information from SDN 501, it should be understood that SDN 501 is a construct of management plane 511, so management plane 511 is already aware of the path information necessary for the purposes of scenario 600. That is, management plane 511 is aware of all intermediate devices on SDN 501 between VTEP 442 and VTEP 443 and is aware of those devices' MTUs. Accordingly, when management plane 511 determines the MTU at step 4 that should be used by VTEP 442 to transfer the packets, management plane 511 can ensure that the MTU is not greater than the smallest MTU along the path. Moreover, management plane 511 may further reduce the MTU size by the amount of overhead required by any protocol that will be in use on the path. For example, if one of the protocols used has an overhead of 100 bytes, then management plane 511 will reduce the MTU size by 100 bytes to allow enough room for those 100 bytes to be added. In a more particular example, host computing system 421 and host computing system 431 may be located at different site locations and IPsec may be used as an intermediate tunnel to encapsulate packets travelling between those two sites (i.e., VXLAN encapsulated packets from VTEP 442 would be further encapsulated using IPsec in an intermediate IPsec endpoint). Management plane 511 would therefore reduce the second MTU by at least an amount of overhead used by IPsec to ensure enough clearance is available for IPsec encapsulation. Some protocols do not have any overhead that impacts the MTU size. For example, a secure sockets layer virtual private network (SSL-VPN) tunnel between sites does not add overhead that would affect MTU size.

In some cases, the amount of overhead used by a particular protocol may be different depending on the packets themselves. For instance, the Geneve protocol can carry information about the packets in its overhead metadata. That information may include a user or process identifier for the packets, which may be relevant to the receiver of the packets (e.g., service chain implementations may benefit from such information as packets are passed to subsequent applications in the service chain. The amount of metadata needed to transfer such information may vary. Therefore, the MTU request sent at step 2 may include an indication as to how much metadata will be required for the packets or may include an indication of the metadata information itself so that management plane can calculate how much metadata will be needed and reduce the MTU accordingly.

Once the MTU has been determined by management plane 511, management plane 511 responds to the MTU request at step 5 with what will be known as the second MTU for the packets. VTEP 442 then performs as described in scenario 700 before transferring the packets to VTEP 443.

Figure 7:
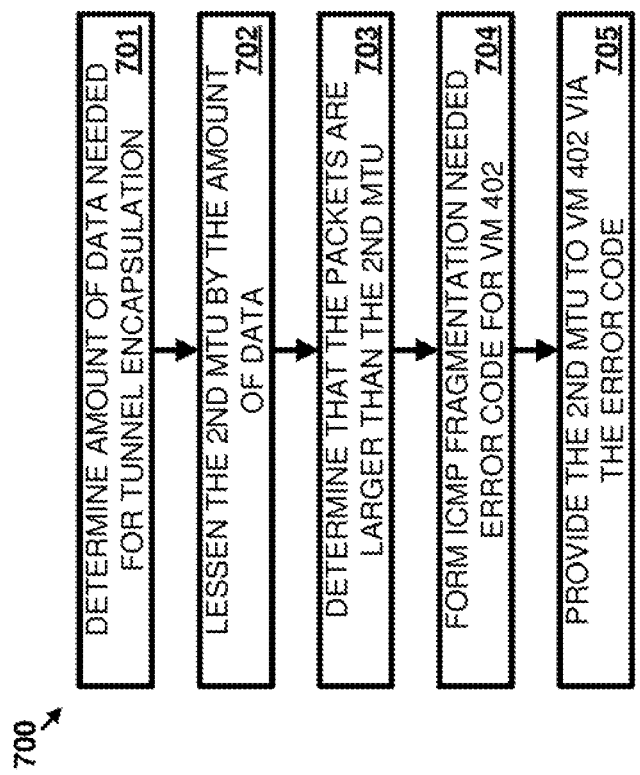
FIG. 7 illustrates another scenario for the other implementation to automatically detect MTU size across an SDN.

FIG. 7 illustrates scenario 700 for implementation 400 to automatically detect MTU size across an SDN. In scenario 700, steps 701 and 702 perform steps similar to those that may be performed by management plane 511, as described above with respect to determining an amount of overhead used by protocols on the path between VTEP 442 and VTEP 443. Steps 701 and 702 are specific to the overhead needed for a tunnel created between VTEP 442 and VTEP 443. Although, it should be understood that management plane 511 may perform steps 701 and 702 itself during step 4 of scenario 600.

Scenario 700 begins with VTEP 442 determining an amount of metadata needed as overhead during the encapsulation of the packets (701). The amount of data needed to encapsulate packets in VXLAN is static. Hence VTEP 442 can use that static amount. However, if VTEP 442 was a different type of endpoint, such as a Geneve tunnel endpoint, then VTEP 442 would determine an amount of metadata required. The amount of metadata may depend on the information carried in the encapsulated packets, such as a user associated with the packets, a process associated with the packets, a classification for the packets, and/or some other type of information related to the packets. In those cases, VTEP 442 would receive that information along with the packets from virtual machine 402 and would calculate the amount of metadata needed to carry that information in the overhead of the Geneve protocol.

VTEP 442 then lessens the second MTU by at least the amount of data required by the tunnel encapsulation, if any (702). The second MTU is then ready to be applied to the packet traffic received at step 1. Accordingly, VTEP 442 determines whether the packets, as they are currently, satisfy the second MTU (i.e., are smaller than the second MTU). If the packets do satisfy the second MTU, then VTEP 442 can proceed to step 9 of scenario 600, as discussed below. In this example, VTEP 442 determines that the packets do not satisfy the second MTU (703). Thus, the packets will need to be resized to satisfy the second MTU before they are transferred. Otherwise, the packets would get rejected at the point along the path that required the second MTU to be as small as it is.

In this example, to inform virtual machine 402 that the size of the packets needs to be reduced to satisfy the second MTU, VTEP 442 forms an Internet Control Message Protocol (ICMP) message indicating a fragmentation-needed error code for the packets (704). Furthermore, the error code indicates the second MTU size so that virtual machine 402 will be aware of the size requirements for the packets (705).

In some examples, VTEP 442 may store the second MTU so that VTEP 442 does not need to query management plane 511 again the next time packets are received that are destined for VTEP 443. If a protocol with dynamic overhead is being used, the subsequent packets may also have to be of a type that would result in the same amount of overhead to ensure all relevant factors are equal before VTEP 442 reuses the second MTU with the subsequent packets. Alternatively, VTEP 442 may be able to adjust the second MTU itself based on the amount of overhead that VTEP 442 determines will be used by the subsequent packets.

Referring back to scenario 600, VTEP 442 transfers the ICMP message with the error code at step 7 to virtual machine 402. A virtualized network interface of virtual machine 402 may then resize the packets in accordance with the second MTU or the message may be passed to guest OS 408 so that guest OS 408 can resize the packets. The resized packets that satisfy the second MTU are then passed to VTEP 442 at step 8 where they are encapsulated for tunneling between VTEP 442 and VTEP 443. The encapsulated packets are transferred at step 9 from VTEP 442 over SDN 501 to VTEP 443. Upon receipt, VTEP 443 removes the encapsulation and passes the packets at step 10 to their destination in virtual machine 405. Since the second MTU was determined for the path between VTEP 442 and VTEP 443 before the packets were transferred, the packets should not be rejected for being too large at any point along the path, absent any circumstances unforeseen by management plane 511.

Additionally, while the above described examples obviate the need to perform path MTU discovery (PMTUD) across SDNs, PMTUD may be still employed between VTEP 442 and VTEP 443 to ensure no physical elements were added of which VTEP 442 and management plane 511 are unaware. If another MTU is discovered using PMTUD that is lower than the already determined second MTU, then the second MTU will have to be lowered by VTEP 442 to satisfy that newly discovered MTU. Likewise, VTEP 442 may inform management plane 511 of the discovery so that management plane 511 can factor the new MTU into future MTU determinations.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of discovering a maximum transmission unit (MTU) across a software defined network (SDN), the method comprising:
   in a management plane of the SDN:
      receiving a first MTU request from a first endpoint of the SDN that indicates a second endpoint of the SDN to which the first endpoint will transfer first data;
      tracing a first path through the SDN for the first data between the first endpoint and the second endpoint;
      determining the smallest MTU along the first path;
      determining an amount of metadata required for network overhead when transferring data between the first endpoint and the second endpoint, wherein the network overhead includes metadata for a network tunnel between the first endpoint and the second endpoint;
      setting a first MTU to a value less than or equal to the smallest MTU along the first path less the amount of metadata; and
      providing the first MTU to the first endpoint.

2. The method of claim 1, wherein the first endpoint transfers the first data to the second endpoint using the first MTU.

3. The method of claim 1, wherein the network tunnel comprises a Virtual Extensible Local Area Network (VXLAN) or Geneve tunnel.

4. The method of claim 1, wherein the network overhead includes data necessary for one or more protocols in the Internet Protocol Security (IPsec) suite of protocols.

5. The method of claim 1, wherein the first endpoint transfers the first MTU request to the management plane upon receiving the first data from a virtual machine.

6. The method of claim 5, wherein the first endpoint instructs the virtual machine to resend the first data using the first MTU when the first data does not comply with the first MTU.

7. The method of claim 1, wherein the first endpoint stores the first MTU for use with subsequent data between the first endpoint and the second endpoint.

8. The method of claim 1, wherein the first endpoint probes a physical network path corresponding to the first path to determine whether a MTU of an element on the physical network path decreases the first MTU.

9. A method of discovering a maximum transmission unit (MTU) across a software defined network (SDN), the method comprising:
   in a management plane of the SDN:
      receiving a first MTU request from a first endpoint of the SDN that indicates a second endpoint of the SDN to which the first endpoint will transfer first data;
      tracing a first path through the SDN for the first data between the first endpoint and the second endpoint;
      determining the smallest MTU along the first path;
      receiving first descriptive information from the first endpoint that describes the first data;
      determining an amount of metadata required for network overhead when transferring data between the first endpoint and the second endpoint based on the descriptive information, wherein different descriptive information results in different amounts of metadata required for the network overhead;
      setting a first MTU to a value less than or equal to the smallest MTU along the first path less the amount of metadata; and
      providing the first MTU to the first endpoint.

10. A system of discovering a maximum transmission unit (MTU) across a software defined network (SDN), the system comprising: one or more computer readable storage media; a processing system with processing circuitry operatively coupled with the one or more computer readable storage media; and program instructions stored on the one or more computer readable storage media that, when read and executed by the processing system, direct the processing system to:
   provide a management plane of the SDN;
   in the management plane:
      receive a first MTU request from a first endpoint of the SDN that indicates a second endpoint of the SDN to which the first endpoint will transfer first data;
      trace a first path through the SDN for the first data between the first endpoint and the second endpoint;
      determine the smallest MTU along the first path;
      determine an amount of metadata required for network overhead when transferring data between the first endpoint and the second endpoint, wherein the network overhead includes metadata for a network tunnel between the first endpoint and the second endpoint;

set a first MTU to a value less than or equal to the smallest MTU along the first path less the amount of metadata; and provide the first MTU to the first endpoint.

11. The system of claim 10, wherein the first endpoint transfers the first data to the second endpoint using the first MTU.

12. The system of claim 10, wherein the network tunnel comprises a Virtual Extensible Local Area Network (VXLAN) or Geneve tunnel.

13. The system of claim 10, wherein the network overhead includes data necessary for one or more protocols in the Internet Protocol Security (IPsec) suite of protocols.

14. The system of claim 10, wherein the first endpoint transfers the first MTU request to the management plane upon receiving the first data from a virtual machine.

15. The system of claim 14, wherein the first endpoint instructs the virtual machine to resend the first data using the first MTU when the first data does not comply with the first MTU.

16. The system of claim 10, wherein the first endpoint stores the first MTU for use with subsequent data between the first endpoint and the second endpoint.

17. The system of claim 10, wherein the first endpoint probes a physical network path corresponding to the first path to determine whether a MTU of an element on the physical network path decreases the first MTU.

18. A system of discovering a maximum transmission unit (MTU) across a software defined network (SDN), the system comprising: one or more computer readable storage media; a processing system with processing circuitry operatively coupled with the one or more computer readable storage media; and program instructions stored on the one or more computer readable storage media that, when read and executed by the processing system, direct the processing system to:

provide a management plane of the SDN;
in the management plane:
receive a first MTU request from a first endpoint of the SDN that indicates a second endpoint of the SDN to which the first endpoint will transfer first data;
trace a first path through the SDN for the first data between the first endpoint and the second endpoint;
determine the smallest MTU along the first path;
receive first descriptive information from the first endpoint that describes the first data;
determine an amount of metadata required for network overhead when transferring data between the first endpoint and the second endpoint based on the descriptive information, wherein different descriptive information results in different amounts of metadata required for the network overhead;
set a first MTU to a value less than or equal to the smallest MTU along the first path less the amount of metadata; and
provide the first MTU to the first endpoint.

19. A system of discovering a maximum transmission unit (MTU) across a software defined network (SDN), the system comprising: one or more computer readable storage media; a processing system with processing circuitry operatively coupled with the one or more computer readable storage media; and program instructions stored on the one or more computer readable storage media that, when read and executed by the processing system, direct the processing system to:

provide a first endpoint of the SDN;
in the first endpoint:

transfer a first MTU request to a management plane of the SDN that indicates a second endpoint of the SDN to which the first endpoint will transfer first data, wherein the management plane, responsive to receiving the first MTU request, traces a first path through the SDN for the first data between the first endpoint and the second endpoint, determines the smallest MTU along the first path, determine an amount of metadata required for network overhead when transferring data between the first endpoint and the second endpoint, wherein the network overhead includes metadata for a network tunnel between the first endpoint and the second endpoint, sets a first MTU to a value less than or equal to the smallest MTU along the first path less the amount of metadata, and provides the first MTU to the first endpoint; and receive the a first MTU from the management plane in response to the first MTU request.

20. The system of claim 19, wherein the program instructions further direct the processing system to:
transfer the first data to the second endpoint from the first endpoint using the first MTU.

21. The system of claim 19, wherein the program instructions further direct the processing system to:
receive the first data from a virtual machine, wherein the first MTU request is transferred in response to receiving the first data.

22. The system of claim 19, wherein first endpoint comprises a network tunnel endpoint.

23. The system of claim 22, wherein the network tunnel comprises a Virtual Extensible Local Area Network (VXLAN) or Geneve tunnel.

24. The system of claim 19, wherein the program instructions further direct the processing system to:
in the first endpoint, store the first MTU for use with subsequent data between the first endpoint and the second endpoint.

25. The system of claim 19, wherein the program instructions further direct the processing system to:
in first endpoint, probe a physical network path corresponding to the first path to determine whether a MTU of an element on the physical network path decreases the first MTU.

26. A system of discovering a maximum transmission unit (MTU) across a software defined network (SDN), the system comprising: one or more computer readable storage media; a processing system with processing circuitry operatively coupled with the one or more computer readable storage media; and program instructions stored on the one or more computer readable storage media that, when read and executed by the processing system, direct the processing system to:

provide a first endpoint of the SDN;
in the first endpoint:
receive first data from a virtual machine using an initial MTU;
in response to receiving the first data, transfer a first MTU request to a management plane of the SDN that indicates a second endpoint of the SDN to which the first endpoint will transfer the first data, wherein the management plane, responsive to receiving the first MTU request, traces a first path through the SDN for the first data between the first endpoint and the second endpoint, determines the smallest MTU along the first path, determine an amount of metadata required for network overhead when transferring data between the first endpoint and the second endpoint, sets a first MTU to a value less than or equal to the smallest MTU along the first path less the amount of metadata, and provides the first MTU to the first endpoint;

receive the first MTU from the management plane in response to the first MTU request;

determine that the initial MTU does not comply with the first MTU;

notify the virtual machine of the first MTU; and receive the first traffic a second time from the virtual machine using the first MTU.

27. The system of claim 26, wherein to notify the virtual machine of the first MTU, the program instructions direct the processing system to:

generate an Internet Control Message Protocol (ICMP) message indicating a fragmentation-needed error code; and transfer the ICMP message to the virtual machine.

* * * * *